United States Patent
Laffey et al.

(10) Patent No.: US 8,589,229 B2
(45) Date of Patent: Nov. 19, 2013

(54) IMMEDIATE UPDATING OF GLOBAL POSITIONING SYSTEM (GPS) GENERATED AREA MAPS ON WIRELESS COMPUTER CONTROLLED DISPLAYS

(75) Inventors: Patrick Laffey, Austin, TX (US); Daniel N. Nguyen, Austin, TX (US); Vit T. Tran, Austin, TX (US); Kim-Khanh V. Trans, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/861,126

(22) Filed: Aug. 23, 2010

(65) Prior Publication Data

US 2012/0047018 A1    Feb. 23, 2012

(51) Int. Cl.
*H04Q 7/20* (2006.01)

(52) U.S. Cl.
USPC ............... 705/14.58; 455/456.6; 455/457; 340/995.1; 340/995.12

(58) Field of Classification Search
USPC .................. 340/995.12; 455/456.6
See application file for complete search history.

(56) References Cited

U.S. PATENT DOCUMENTS

| | | | |
|---|---|---|---|
| 6,140,943 A * | 10/2000 | Levine | 340/995.12 |
| 6,801,779 B1 | 10/2004 | Liebenow | |
| 7,345,628 B2 | 3/2008 | Soundararajan | |
| 2002/0091568 A1 | 7/2002 | Reiner et al. | |
| 2005/0192748 A1 | 9/2005 | Oleg et al. | |
| 2005/0221843 A1 * | 10/2005 | Friedman et al. | 455/456.6 |
| 2007/0121557 A1 | 5/2007 | Sylvain | |
| 2007/0149212 A1 | 6/2007 | Gupta et al. | |

OTHER PUBLICATIONS

Navigate with a Tablet PC and Microsoft Streets & Trips 2005 With GPS Locator, Tony Northrup, Apr. 2005, http://wwwl.microsoft.com/windowsxp/using/tablepc/learnmore/northrup_navigate.mspx.

* cited by examiner

*Primary Examiner* — John G Weiss
*Assistant Examiner* — Marilyn G Macasiano
(74) *Attorney, Agent, or Firm* — J. B. Kraft; David A. Mims

(57) ABSTRACT

Immediate changes and updates in a Global Positioning System (GPS) providing wireless communication display devices with displayed maps of a defined areas with traffic and objects of interest information are implemented through broadcasting short range RF information relative to an object from an object located within the defined area. When this broadcast information is received by the transceiver of any wireless display device within RF broadcast range, the receiving device obtains the position of the object from a GPS satellite based upon the information received by the wireless display device and the object and the information are displayed.

9 Claims, 5 Drawing Sheets

IMMEDIATE UPDATING OF GLOBAL POSITIONING SYSTEM (GPS) GENERATED AREA MAPS ON WIRELESS COMPUTER CONTROLLED DISPLAYS

TECHNICAL FIELD

The present invention relates to methods and programs for computer generated displayed maps, and particularly to to GPS generated maps of a defined area on wireless communication display devices, including traffic patterns, routes and locations of objects of interest information provided from a GPS satellite provider.

BACKGROUND OF RELATED ART

Wireless communication computer controlled display devices are now pervasive, numbering in the hundreds of millions if not billions throughout the world. These devices include virtually all laptop computers, hand held computers, display smart phones, video game devices, personal digital assistants (PDAs), iPads™ and almost any mobile communication display device, are enabled to be wireless through Wi-Fi (Wireless Fidelity) technology, i.e. IEEE 802.11 protocol technology. The Wi-Fi Alliance, a global association of companies, government agencies and educational institutions, has standardized these IEEE 802.11 protocols into the Wi-Fi implementation. The IEEE 802.11 wireless transmission protocols are discussed in greater detail at pp. 60-62 in the text, *Peter Norton's Complete Guide to Networking*, SAMS Division of MacMillan Computer Publishing, Indianapolis, Ind., 1999, pp. 49-62; as well as in the article, *A Wireless Local Area Network Protocol That Improves Throughput Via Adaptive Control*, B. E. Mullins et al., *Proceedings of the IEEE International Conference on Communications*, pp. 1427-1431, June 1997. The short range transmissions from transceivers in the display devices can operate within facility areas from 10 to 100 meters in diameter from central or optimally located facility transceivers, called hotspots or access points, in the Wi-Fi network connections to the Internet. These hotspots are often provided free of charge at community facilities such as hotels, restaurants, libraries and airports. On the other hand, individual users may obtain Wi-Fi access through Wi-Fi providers through routers set up in the users' homes or businesses. Such routers provide the Wi-Fi user subscriber with a line modem or cable modem to an access point.

In addition, all of the above-described wireless communication computer controlled display devices are enabled to subscribe to a global positioning system (GPS) to generate and display on the devices defined area maps for the areas within which the GPS has located the display device position. Global positioning is a well known and developed system that uses groups of three satellites that receive signals from the moving unit being positioned and use this signal data to triangulate and, thus, position the moving unit.

GPS is now extensively used to create travel/shopping maps displayed on GPS implemented wireless display devices that display maps of a defined area with traffic and objects of interest information provided from a GPS satellite. GPS is described in the article, *Navigate with a Tablet PC and Microsoft Streets & Trips 2005 With GPS Locator*, Tony Northrup, April 2005, and available on the Internet at: http://www.microsoft.com/windowsxp/using/tablepc/learnmore/northrup_navigate.mspx.

Such GPS mapping systems are installed on a large share of the current mobile wireless display devices. From such maps, the mobile user, either walking or riding in a motor vehicle, may get routing information and, to a greater extent, information about mapped objects of interest representative of restaurants, hotels, stores, historical, civic and like objects of interest to the mobile consumer.

These GPS mapping services are provided by a GPS provider to the users of the mobile wireless display devices at appropriate fees and are, likewise, provided to restaurants, hotels, stores and like businesses and organizations at appropriate fees for their respective mapped objects. While these displayed GPS maps have been highly successful in helping the traveler with routing, sightseeing and facility services information, there does remain a mapping aspect for which improvement is being sought. There have been limits on the ability for GPS to provide instantaneous or immediate updates or changes with respect to the mapped objects and their ancillary displayed information. In order to update the GPS displayed maps, the organizations or facilities represented by the mapped objects must communicate the changed information to the GPS service provider, which, in turn, will format suitable changes to the map displayed for the defined area. Such updates may take hours, if not a day or two. The disadvantage of such delays in mapped routes is obvious when such changes are the result of road emergencies or construction changes that will cause delays or bypasses. However, businesses often have similar needs for immediate updates. Hotels may become booked up and suddenly have rooms available or a store may have a sudden sale. The present invention is directed to supplementing current GPS mapping functions with implementations for displaying information of immediate or instantaneous interest.

SUMMARY OF THE PRESENT INVENTION

The present invention provides for immediate changes and updates in GPS providing wireless communication display devices with displayed maps of a defined area with traffic and objects of interest information provided from GPS satellites. This is implemented by conventionally displaying a map of a defined area on a wireless communication display device including traffic and object of interest information provided from a GPS satellite on all of the wireless communication devices having GPS located within the area.

When a business or organization wishes to make an immediate change, GPS will broadcast short range RF information relative to an object from the object located within the defined area. When this broadcast information is received by the transceiver of any wireless display device within RF broadcast range, the receiving device obtains the position of the object from a GPS satellite based upon the information received by the wireless display device and the object, as well as the information, is displayed at the position of the object on the GPS displayed map of the wireless display device.

In the case where the business or organization broadcasting the change is already a GPS subscriber and, thus, displayed as an object of interest on said map, the changed information is updated on the map in association with the displayed object. In the case where the broadcaster requesting the change is not a GPS subscriber, a new object may be positioned on the map representative of the broadcasting business for the benefit of the mobile display device users and an implementation may be provided to enable the non-GPS subscriber business to compensate the GPS service provider for displaying the object and the related information.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
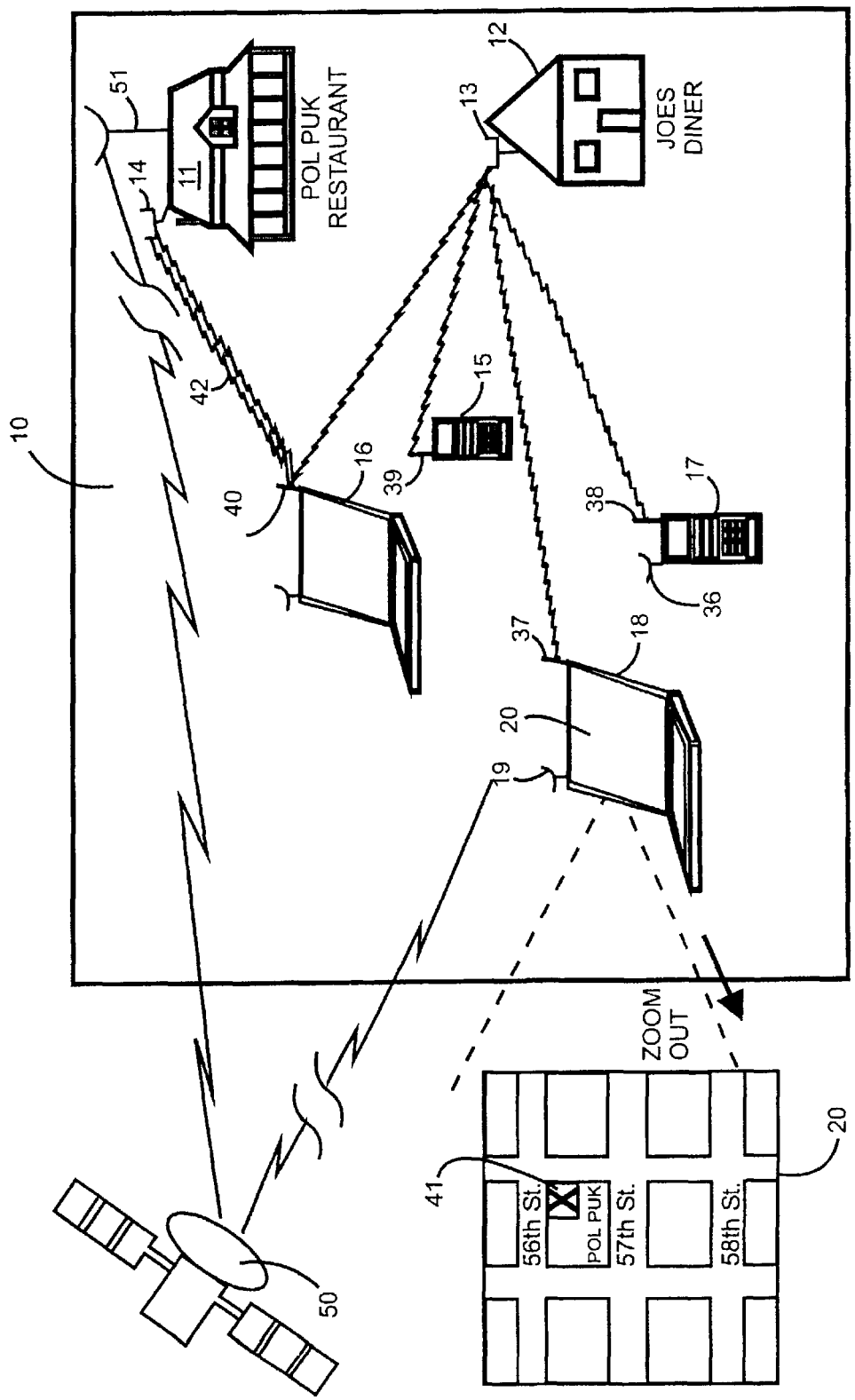
FIG. 1 is a generalized illustrative diagrammatic view of an area that is being mapped on a wireless mobile display device so as to illustrate the defined area and some business objects and wireless display devices located within the area.

Referring to FIG. 1, there is shown a generalized diagrammatic view of an area that is being mapped on a wireless mobile display device so as to illustrate the defined area and some business objects and wireless display devices located within the area. The defined area 10 is, for example, about ¼ of a mile square. Within area 10, there are two restaurants, Pol Puk 11, which is a subscriber to a GPS system as exemplified by dish antenna 51 communicating with GPS satellite 50, and Joe's Diner, which is not a GPS subscriber. Within the defined area 10, at any one point in time, there may be many mobile wireless communication display devices (illustrated as devices 15, 16, 17 and 18), many of the devices, e.g. devices 17 and 18, will be GPS subscribers, as illustrated by their respective dish antennae 36 and 19 communicating with GPS satellite 50. The display devices 16, 17 and 18, that subscribe to GPS through an appropriate GPS provider, will have access to displayed maps of area 10 with the conventional traffic routing and information about objects of interest, as described in the above-mentioned article, *Navigate with a Tablet PC and Microsoft Streets & Trips* 2005 *With GPS Locator*. To illustrate, the display screen 20 of device 18 is shown in a zoom out or enlarged version of the displayed map. In this map, it is noted that Pol Puk restaurant, which is a GPS subscriber, has its location 41 positioned on the map. For simplicity of illustration, any ancillary restaurant information has been removed from the map.

However, as will be subsequently shown in FIG. 2, there is provision for ancillary information adjacent to the displayed object, e.g. restaurant. On the other hand, Joe's, which is not a GPS subscriber, is not shown on map 20.

Mobile wireless devices 15 through 18 are all equipped with transceivers for short range RF transmission, as indicated by their respective illustrative RF transmission antennae 36, 37, 39 and 40. It is noted that both Joe's 12 and Pol Puk 11 restaurants have computers provided with RF transceivers, as illustrated by their respective RF antennas, 13 and 14. Thus, both Joe's 12 and Pol Puk 11 are enabled to communicate with all devices within their RF transmission range, which, for the purpose of the present illustration, will be considered to be substantially co-extensive with area 10. The short range RF transmission, to be described between the transceivers of Pol Puk and Joe's, operates under the previously described Wi-Fi implementations using the IEEE 802.11 wireless transmission protocols; as discussed in greater detail in the previously described: *Peter Norton's Complete Guide to Networking*, as well as in the article; *A Wireless Local Area Network Protocol That Improves Throughput Via Adaptive Control*, B. E. Mullins et al., Proceedings of the IEEE International Conference on Communications, pp. 1427-1431, June 1997. The short range transmissions from transceivers in the display devices can operate within facility areas from 10 to 100 meters.

Accordingly, assume that Joe's, which is not a GPS subscriber, wishes to obtain entry, i.e. an object position on GPS maps of all wireless display devices that may randomly be in or passing through area 10. Using Joe's 12 transceiver, Joe's broadcasts via antenna 13 the information using the above-mentioned IEEE 802.11 wireless short range RF transmissions. These broadcast signals are received via RF antennaes connected to the transceivers 37 through 40 of display devices 15 through 18. With Wi-Fi protocols, the short range RF broadcast transmissions from Joe's transceiver to all the wireless display device transceivers within area 10 would use simple peer-to-peer (P2P) direct ad hoc transmission from antenna-to-antenna without any intermediate routers or hotspots.

Of these display devices, only devices 16 through 18 have GPS and are enabled to display Joe's information. The GPS mapping process may give the user of the display device receiving the broadcast RF information about Joe's the option of determining whether the user may have any interest in Joe's or its associated information. If the user is interested, the user may then use the GPS system to determine the position of Joe's on the displayed map from the information that Joe's provided, e.g. address.

Figure 2:
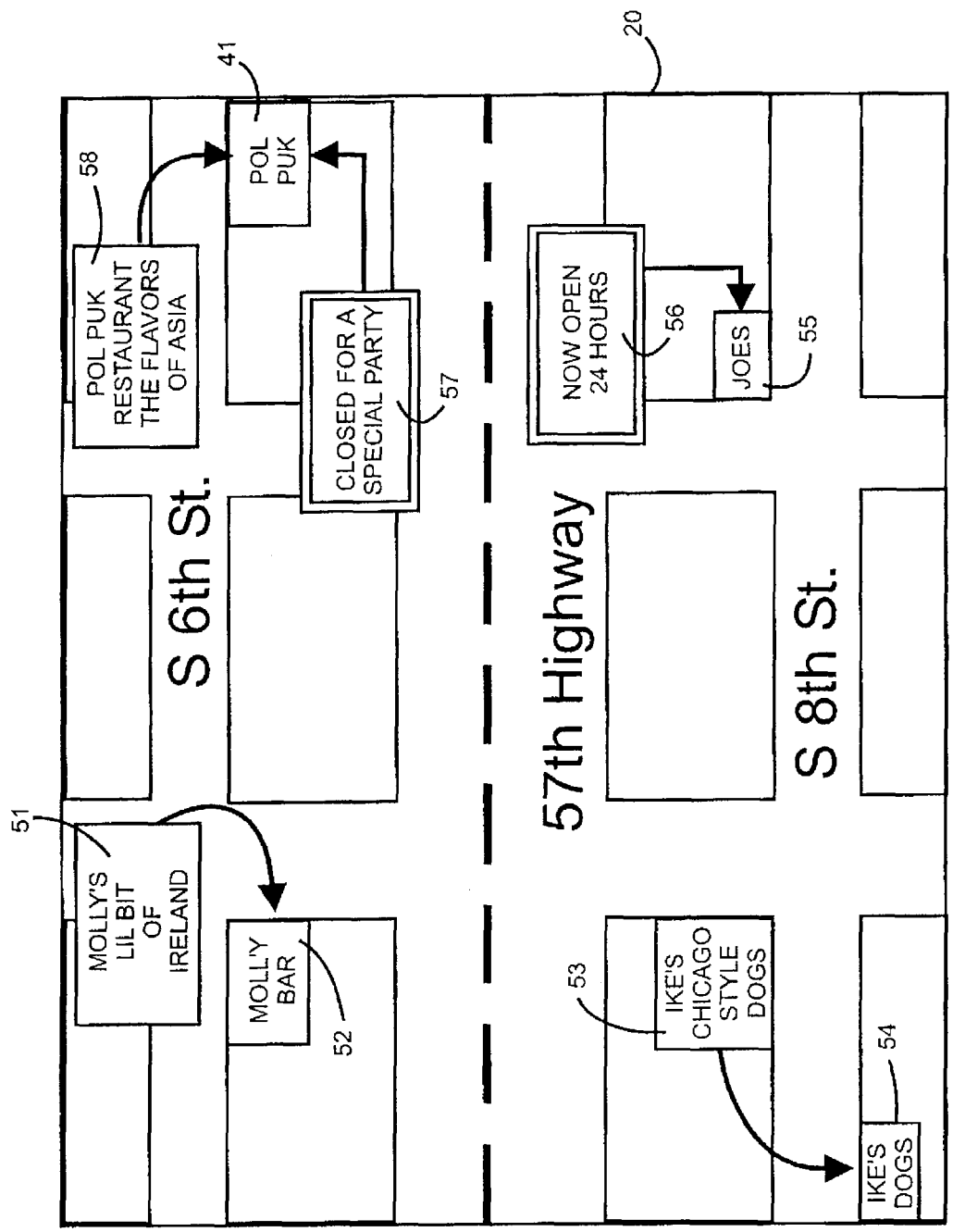
FIG. 2 is a generalized diagrammatic view of the display screen of a display device showing the displayed map of the area shown in FIG. 1.

Alternatively, the process may be set up so that upon receipt of the RF information from Joe's, the receiving device 18 may, transparent to the user, obtain the location from the GPS system and then display the information on the displayed map 20, as shown in the full display screen shown in FIG. 2 wherein the location of Joe's 55 is shown together with the immediate message 56.

It should be noted that where the GPS system provider is involved in the modification of the displayed area maps, such as that shown in FIG. 2, which added Joe's restaurant as a new object with associated information, the provider will be in a position to seek a subscription to GPS services or other compensation from Joe's.

The present invention also provides for businesses or other displayed objects that are GPS subscribers to display immediate or instantaneous information regarding the displayed object on the map. For example, Pol Puk wishes to send an urgent message to its customers that it will be closed for the evening because it has been taken over for a special party. Thus, with respect to FIG. 1, Pol Puk 11 transmits from its RF antennae 14 to the antennae of devices 15 through 18 in area 10. The information is similarly processed as described above and displayed as information 57 in association with the Pol Puk object 41 in the display of FIG. 2 in addition to the standard information 58 posted with respect to the restaurant 41. Also on the displayed map of FIG. 2 are two other restaurants that are GPS subscribers: Molly's Bar 51 with associated standard information 52; and Ike's Chicago Style Hot Dogs 53 with associated information 54.

For simplified purposes of illustration, the immediate mapping updates of the present invention have been illustrated with respect to restaurants. It should be understood that immediate updates may be important to a wide variety of GPS displayed object facilities. For example, a GPS object subscriber could be a municipality highway department and the update may involve emergency road closures.

Figure 3:
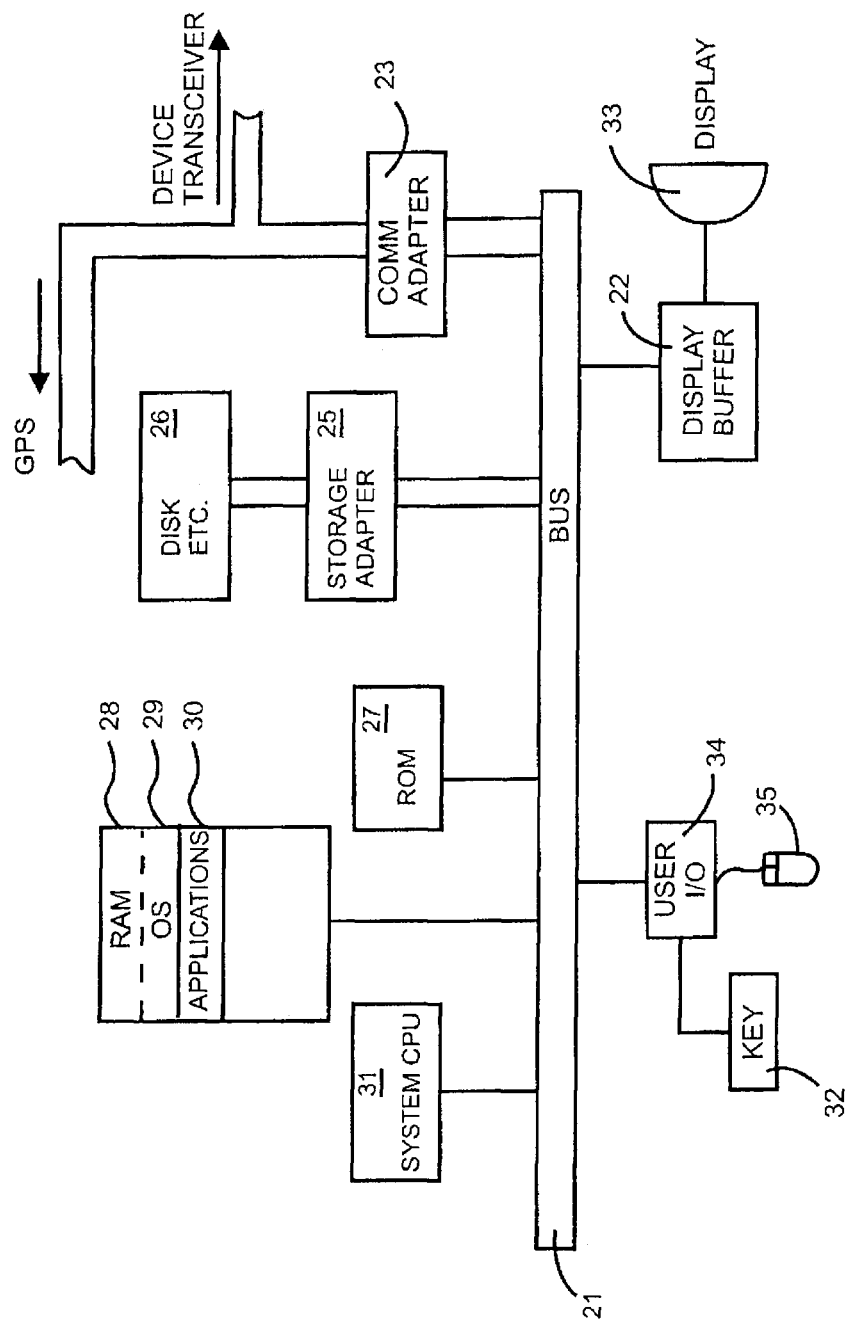
FIG. 3 is an illustrative simplified diagrammatic view of a control processor that may be used in a wireless display device to implement the displayed map of FIG. 2.

With respect to FIG. 3, there is shown an illustrative diagrammatic view of a control processor that may be used in a wireless display device to implement the displayed map of FIG. 2, as well as to implement all of the computers general functions. A central processing unit (CPU) 31 is provided and interconnected to various other components by system bus 21. An operating system, OS 29, runs on CPU 31, provides control and is used to coordinate the function of the various components of FIG. 2. Operating system 29 may be one of the commercially available operating systems. Application programs 30, controlled by the system, are moved into and out of the main memory Random Access Memory (RAM) 28. These programming applications may be used to implement functions of the present invention. ROM 27 includes the Basic Input/Output System (BIOS) that controls the basic computer functions. RAM 28, storage adapter 25 and communications adapter 23 are also interconnected to system bus 21. Storage adapter 25 communicates with the disk storage 26. Communications adapter 23 interconnects bus 21 with the Internet via the device transceiver as described hereinabove. As described herein, the same transceivers are used for the direct ad hoc input from objects being mapped. An appropriate communications adapter supports the transmission to and from the GPS. I/O devices are connected to system bus 21 via user interface adapter 34. Keyboard 32 and mouse 38, when appropriate, may be connected to bus 21 through user interface adapter 34. Display buffer 22 supports an appropriate display 33 on which the maps are generated.

Figure 4:
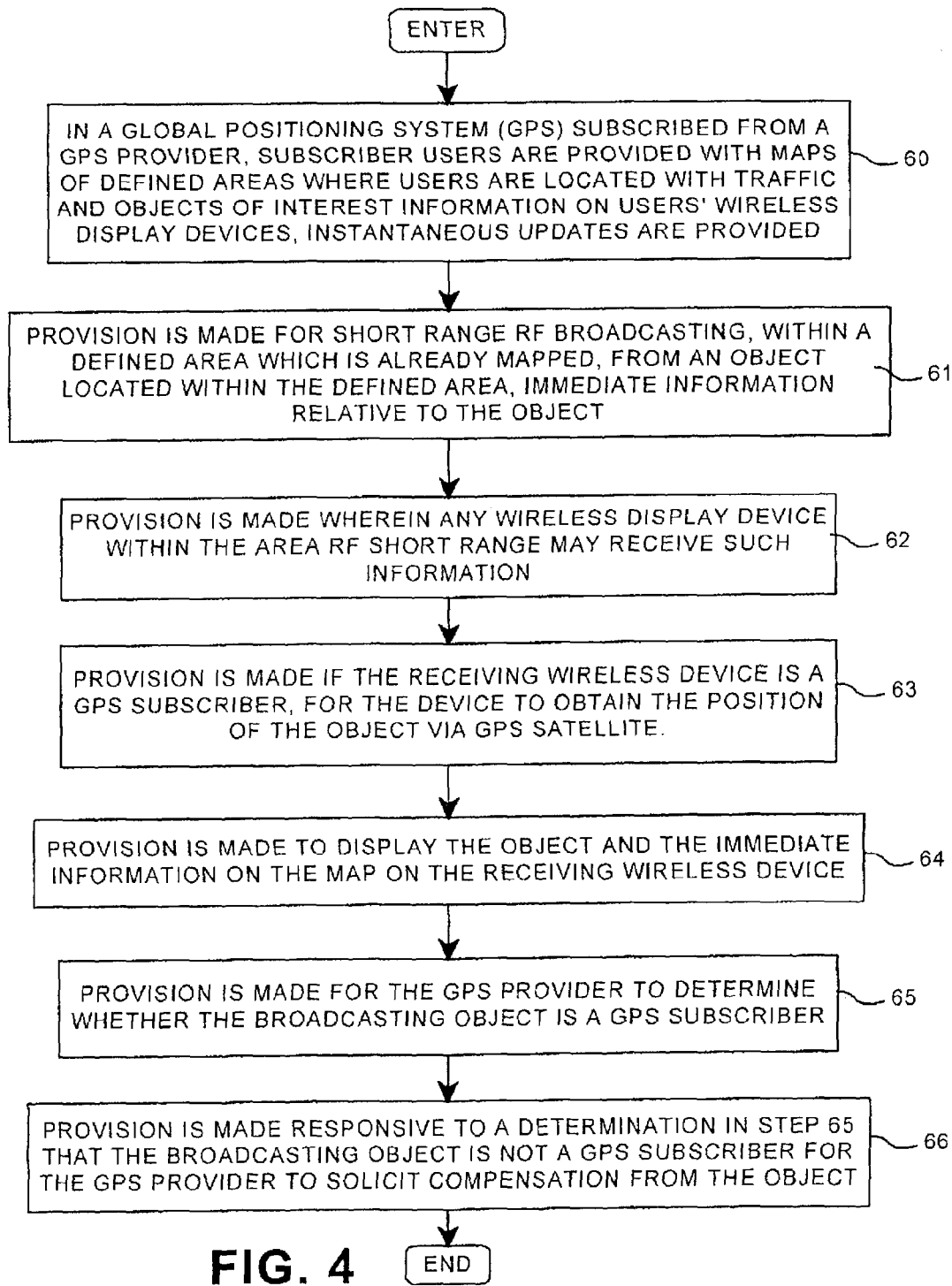
FIG. 4 is a general flowchart of a program set up to implement the present invention for supplementing GPS mapping functions with implementations for displaying information of immediate or instantaneous interest.

FIG. 4 is a general flowchart of a program set up to implement the present invention for supplementing GPS mapping functions with implementations for displaying information of immediate or instantaneous interest.

In a GPS wherein subscriber users are provided with maps of the defined areas where users with wireless mobile computer controlled display devices are located with traffic routing and objects of interest, instantaneous map updates are provided, initial step 60.

Provision is made for short range RF broadcasting within the defined and mapped area from objects located within the area of immediate and instantaneous information relative to the broadcasting object, step 61. Provision is made wherein any wireless device within the RF short range of the broadcast may receive the broadcast information, step 62. If a receiving device is a GPS subscriber, provision is made for the receiving device to obtain the position of the broadcasting object via the GPS satellites, step 63. Provision is made to display the object and the immediate information or update on the map of the receiving device, step 64. Provision is made for the GPS provider to determine whether the broadcasting object is a GPS subscriber, step 65. Provision may be made, responsive to a determination in step 65 that the broadcasting object is not a GPS subscriber, for the GPS provider to solicit compensation from the object, step 66.

Figure 5:
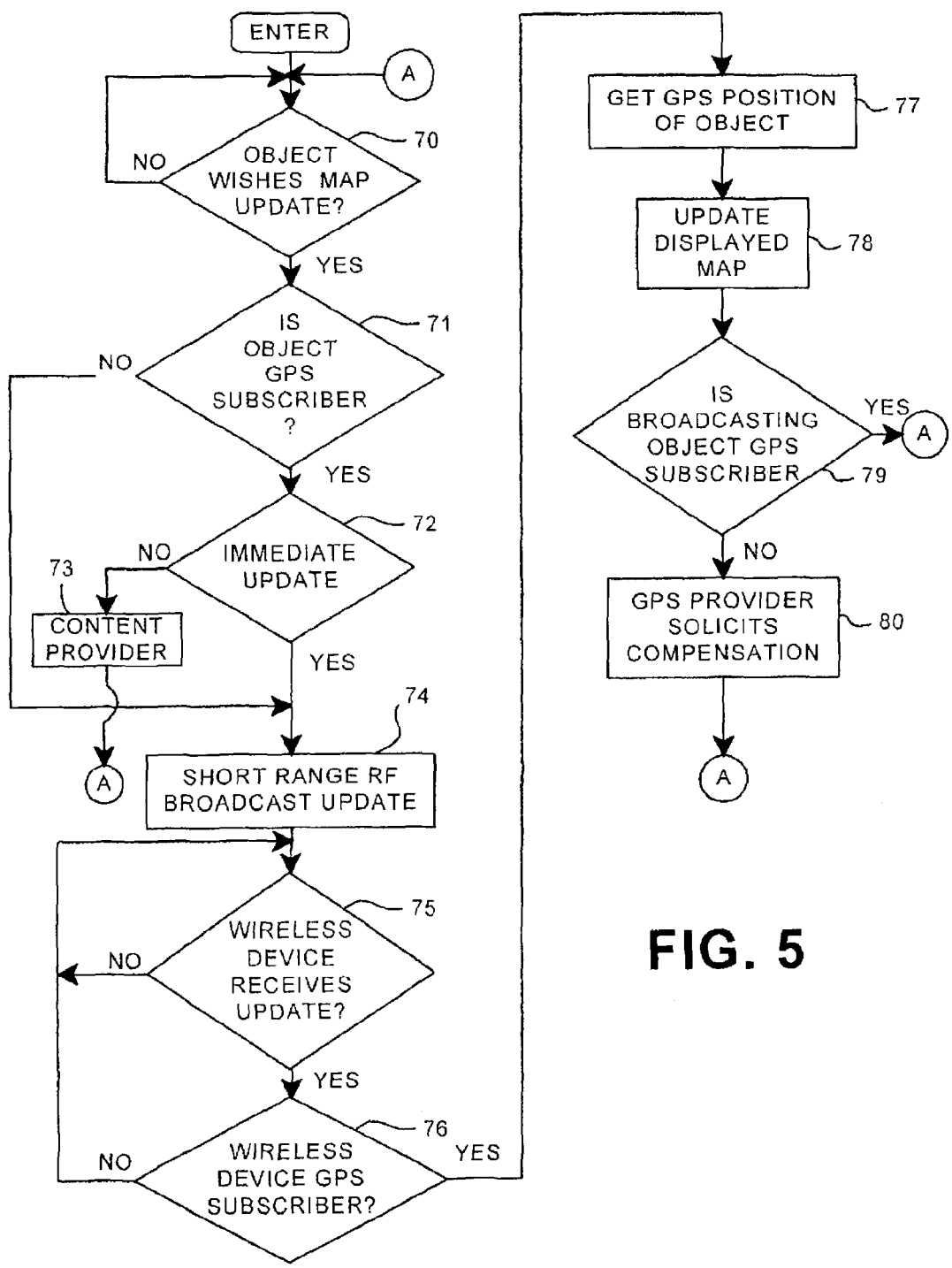
FIG. 5 is a flowchart of an illustrative run of the programs set up in FIG. 4 for displaying information of immediate or instantaneous interest.

A simple illustrative example of a run of the process set up in FIG. 4 will be described with respect to the flowchart of FIG. 5. An initial determination is made as to whether an object, such as a facility, in an area that is GPS mapped wishes to provide an update to the displayed GPS maps on display devices in the area, step 70. If Yes, a determination is made as to whether the object requiring the change is a GPS subscriber, step 71. If Yes, a determination is made as to whether the required update is to be immediate, step 72. If No, the GPS provider is contacted with the information from the object, step 73, so that the update may be made by the GPS provider in its standard map updating. However, if the determination in step 73 is Yes, change or upgrade is immediate or if the determination in step 71 is No, the object requiring the change is not a GPS subscriber, then step 74, the object requiring the change broadcasts the change via short range RF transmission wherein any display device having a short range RF transceiver within the area may receive the change information. Then, when a display device within the area receives the transmitted change, Yes, step 75, a further determination is made as to whether the receiving device is a GPS subscriber, step 76. If No, the receiving device can take no action and the process is returned to step 75. If the determination in step 76 is Yes, the device is a GPS subscriber, then, step 77, the position of the object requesting the change is obtained via GPS and the object and information is displayed on the displayed map of the display device, step 78. At this point, a further determination may be made in step 79 as to whether the broadcasting object for which the map update or change is requested is a GPS subscriber. If No, provision may be made for the GPS provider to solicit subscription or other compensation from the broadcasting object, step 80. If the determination in step 79 is Yes, or after steps 80 and 73, the process is returned to initial step 70 via branch "A".

Although certain preferred embodiments have been shown and described, it will be understood that many changes and modifications may be made therein without departing from the scope and intent of the appended claims.

What is claimed is:

1. In a Global Positioning System (GPS) providing wireless communication display devices with displayed maps of a defined areas with traffic and information of interest provided from a GPS satellite, a method of updating said displayed maps comprising:

displaying a map of a defined area on said wireless communication display devices including traffic and business information of interest provided from a GPS satellite on all of said wireless communication devices having GPS located within said area;

broadcasting short range RF business information of immediate interest from GPS subscriber and GPS non-subscriber business sites located within said defined area;

receiving said broadcast information by a transceiver of one of said wireless communication devices;

obtaining the position of said business site by said one wireless communication device from a GPS satellite based upon said information received by said wireless display device;

determining if said business site is a GPS subscriber;

if said business site is a GPS subscriber, displaying said said business site, and said information of immediate interest at the position of said business site on said GPS displayed map of said wireless communication device; and if said business site is not a GPS subscriber, enabling said non-GPS subscriber business site to compensate said GPS service provider for displaying said non-subscriber business site and said information of immediate interest on said displayed map.

2. The method of claim 1, wherein said obtaining the position of the business site from the GPS satellite is done automatically responsive to receiving the broadcast information by said transceiver and transparently to a user of said device receiving said broadcast information.

3. The method of claim 1, wherein such information is emergency information.

4. A Global Positioning System (GPS) providing wireless communication display devices with displayed maps of a defined area with traffic and information of interest provided from a GPS satellite comprising:
- a processor; and
- a computer memory holding computer program instructions which when executed by the processor perform the method comprising:
- displaying a map of a defined area on said wireless communication display devices including traffic and business information of interest provided from a GPS satellite on all of said wireless communication devices having GPS located within said area;
- broadcasting short range RF business information of immediate interest from GPS subscriber and GPS non-subscriber business sites located within said defined area;
- receiving said broadcast information by a transceiver of one of said wireless communication devices;
- obtaining the position of said business site by said one wireless communication device from a GPS satellite based upon said information received by said wireless display device;
- determining if said business site is a GPS subscriber;
- if said business site is a GPS subscriber, displaying said business site, and said information of immediate interest at the position of said business site on said GPS displayed map of said wireless communication device; and
- if said business site is not a GPS subscriber, enabling said non-GPS subscriber business site to compensate said GPS service provider for displaying said non-subscriber business site and said information of immediate interest on said displayed map.

5. The system of claim 4, wherein said performed method obtains the position of the object from the GPS satellite automatically responsive to receiving the broadcast information by said transceiver and transparently to a user of said device receiving said broadcast information.

6. The system of claim 4, wherein such information is emergency information.

7. A computer usable non-transitory storage medium having stored thereon a computer readable program for providing wireless communication display devices with displayed maps of a defined areas with traffic and information of interest provided from a GPS satellite, wherein the computer readable program when executed on a computer causes the computer to:
- display a map of a defined area on said wireless communication display devices including traffic and business information of interest provided from a GPS satellite on all of said wireless communication devices having GPS located within said area;
- broadcast short range RF business information of immediate interest from GPS subscriber and GPS non-subscriber business sites located within said defined area;
- receive said broadcast information by a transceiver of one of said wireless communication devices;
- obtain the position of said business site by said one wireless communication device from a GPS satellite based upon said information received by said wireless display device;
- determine if said business site is a GPS subscriber;
- if said business site is a GPS subscriber, displaying said business site, and said information of immediate interest at the position of said business site on said GPS displayed map of said wireless communication device; and
- if said business site is not a GPS subscriber, enable said non-GPS subscriber business site to compensate said GPS service provider for displaying said non-subscriber business site and said information of immediate interest on said displayed map.

8. The computer usable medium of claim 7, wherein said computer program when executed on a computer obtains the position of the object from the GPS satellite automatically responsive to receiving the broadcast information by said transceiver and transparently to a user of said device receiving said broadcast information.

9. The computer usable medium of claim 7, wherein such information is emergency information.

* * * * *